US005874902A

United States Patent [19]

Heinrich et al.

[11] Patent Number: 5,874,902

[45] Date of Patent: Feb. 23, 1999

[54] RADIO FREQUENCY IDENTIFICATION TRANSPONDER WITH ELECTRONIC CIRCUIT ENABLING/DISABLING CAPABILITY

[75] Inventors: Harley Kent Heinrich, Brewster; Peter George Capek, Ossining; Thomas Anthony Cofino, Rye; Daniel J. Friedman, Tarrytown; Kevin Patrick McAuliffe, Peekskill, all of N.Y.; Paul Jorge Sousa, Middleton, Mass.; Brian John Hugh Walsh, Clydebank, Scotland

[73] Assignee: International Business Machines Corporation, Armonk, N.Y.

[21] Appl. No.: 681,741

[22] Filed: Jul. 29, 1996

[51] Int. Cl.[6] .......... H04Q 1/00

[52] U.S. Cl. .......... 340/825.54; 340/572; 340/825.72

[58] Field of Search .......... 340/825.54, 825.49, 340/825.72, 825.31, 825.52, 426, 572, 573; 342/24

[56] References Cited

U.S. PATENT DOCUMENTS

| | | | |
|---|---|---|---|
| 3,133,269 | 5/1964 | Cotsworth | 367/197 |
| 3,165,090 | 1/1965 | Smith | 116/137 A |
| 3,189,000 | 6/1965 | Saliners | 116/137 A |
| 3,382,322 | 5/1968 | Duerden | 340/825.52 |
| 4,215,342 | 7/1980 | Horowitz . | |
| 4,686,513 | 8/1987 | Farrar et al. . | |
| 4,691,801 | 9/1987 | Mann | 340/426 |
| 4,791,409 | 12/1988 | Reid | 340/825.72 |
| 4,827,395 | 5/1989 | Anders | 340/825.54 |
| 4,851,815 | 7/1989 | Enkelmann . | |
| 5,030,807 | 7/1991 | Landt et al. . | |
| 5,030,940 | 7/1991 | Siikarla . | |
| 5,032,823 | 7/1991 | Bower et al. . | |
| 5,151,684 | 9/1992 | Johnsen . | |
| 5,241,299 | 8/1993 | Appalucci et al. . | |
| 5,276,728 | 1/1994 | Pagliaroli | 340/426 |
| 5,304,982 | 4/1994 | Cordery . | |
| 5,337,040 | 8/1994 | Kind . | |

OTHER PUBLICATIONS

*Micron RFID Communications Protocol* Micron Communications, Inc., Jul. 22, 1993, Title Page & Overleaf, Table of Contents, and pp. 1–71.

*LS/S/TTL Logic Databook,* National Semiconductor Corporation, 1989, Title Page, p. iii, and pp. 2–137.

*Primary Examiner*—Brian Zimmerman

*Attorney, Agent, or Firm*—Louis J. Percello; Ronald L. Drumheller

[57] ABSTRACT

An RF tag has an enable/disable circuit connected to a critical part of an electronic object/circuit, e.g. a computer mother board. The critical part of the circuit is any circuit component and/or connection that can enable and/or disable the electric circuit operation. Signals are sent to the tag to change data in the tag memory which causes the enable/disable tag circuit to control the critical part to enable and disable the electric circuit. A system checks the status of the tag, e.g. the electronic circuit was paid for, before enabling the electronic circuit.

20 Claims, 12 Drawing Sheets

RADIO FREQUENCY IDENTIFICATION TRANSPONDER WITH ELECTRONIC CIRCUIT ENABLING/DISABLING CAPABILITY

FIELD OF THE INVENTION

This invention relates to the field of Radio Frequency (RF) tagging. More specifically, the invention relates to an RF transponder (tag) that can enable and/or disable the operation of an external electronic circuit.

BACKGROUND OF THE INVENTION

The prior art has addressed the notion of remotely enabling and/or disabling a circuit with radio frequency transponders. Philips Corp. has disclosed a vehicle immobilization technology that only permits a vehicle motor to start when a changeable code is passed from a tag in an ignition key to a circuit that is connected to the vehicle engine. The tag is not electrically connected to the circuit. In that technology, a complex tag reader is needed for each engine circuit that is to be enabled/disabled. The relatively simple tag in the key has to be in a specific proximity (location) with respect to the tag reader in order for the reader to access the code on the tag. Further, the tag reader will require power from some source associated with the enabled/disabled circuit. Because of the complexity, expense, and power requirements of the tag reader, this system is limited to enable/disable expensive circuits with on-board power.

RF tagging systems are also used to prevent theft in the retail industry, e.g. the sale of electronic equipment. It is estimated that retailers and manufacturers lose at least one per cent of their sales every year due to theft or 'shrinkage'. The current approach to this problem is to place either an electronic article surveillance (EAS) tag, or an RF identification tag onto the item. These systems rely on either detecting the presence of an item within the proximity of a base station or the complete identifying of the tag. Both of these systems rely on the ability of the reader to detect a tag as it leaves a designated area. These systems basically are only able to activate an alarm when a stolen item is detected. If the system is defeated in some way, the stolen item, e.g., an electrical circuit will still be able to function. Therefore, a thief will have an incentive to defeat the system to pilfer the electronic equipment.

OBJECTS OF THE INVENTION

An object of this invention is an RF tag capable of enabling and/or disabling an electronic circuit.

An object of this invention is an RF tag electrically connected to an electronic circuit, the RF tag being capable of enabling and/or disabling the electronic circuit.

An object of this invention is a RF tag that is electrically connected to and capable of enabling and/or disabling an electronic circuit in order to prevent the theft of the electronic circuit.

An object of this invention is a method of enabling and/or disabling an electronic circuit by sending signals to an RF tag electrically connected to the electronic circuit, the RF tag being capable of enabling and/or disabling the electronic circuit.

SUMMARY OF THE INVENTION

A novel RF tag has an analog or digital output that is capable of being connected to a critical part of an electronic object/circuit, e.g. a computer mother board. The critical part of the circuit is any circuit component and/or connection that is capable of enabling and/or disabling the electric circuit operation when the output of the tag that interfaces with the critical part changes. There are different types of tag outputs depending on the design of the critical part. Tag outputs include outputs which may change state only once, like fusible links or write once memory elements, or outputs which may change back and forth many times such as logic input to the critical part, and/or a variable(s) stored in a tag memory. In one preferred embodiment, the tag output causes the critical part to disable the electronic circuit. In one theft prevention application, all electronic equipment is stored in a disabled state, until a signal from a base station causes the tag output to change and therefore enables the electronic circuit. When a person desires to remove the electronic circuit from a designated area, e.g., in order to purchase and/or use the electronic circuit, the person must first present the item to an item identification system to check out, i.e., enable the electronic circuit. The system causes the tag switch output to transfer to the state that enables the electronic circuit. Unless properly checked out, the electronic circuits are non functioning, i.e., disabled. Alternative embodiments have an encryption capability.

BRIEF DESCRIPTION OF THE DRAWINGS

The foregoing and other objects, aspects and advantages will be better understood from the following detailed description of preferred embodiments of the invention with reference to the drawings that include the following.

DETAILED DESCRIPTION OF THE INVENTION

Figure 1:
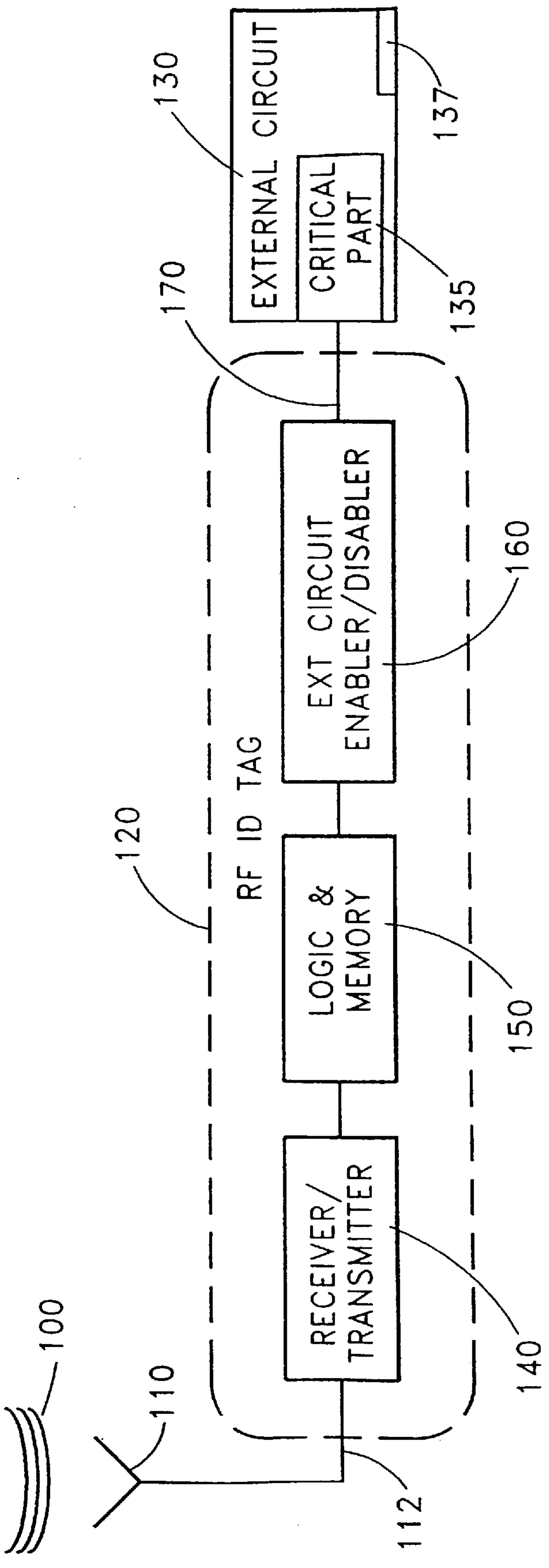
FIG. 1 is a block diagram of a preferred embodiment of the RF identification tag with electronic circuit enabling/disabling capability.

FIG. 1 shows a diagram of a preferred embodiment of an RF identification tag 120 with electronic circuit enabling/disabling capability. The RF identification tag 120 receives RF energy from an external base station (not shown) in the form of RF energy 100. The RF energy is received by an RF antenna 110 and passed to the RF tag receiver/transmitter 140 over line 112. The receiver/transmitter 140 may include power and power regulation circuits, described below. Signals may be passed from the receiver/transmitter 140 to the logic and memory circuits 150 and to the external circuit enabler/disabler 160. The information from the RF signal 100 is received by the receiver/transmitter 140 and passed as logic signals to the processing logic and memory 150 in the tag 120. The tag processing logic and memory 150 control the external circuit enabler/disabler interface circuit 160, that in turn controls the external electronic circuit 130 via a connection 170. Examples of the circuit 130 include: computer circuitry, e.g. a "mother board"; a packaged chip such as a microprocessor or memory chip, or a plug in circuit board comprising a number of memory and/or logic chips. These circuits are well known and are used for example in watches; appliances; consumer electronics; automotive electronics; electronic toys; manufacturing and assembly electronics (e.g. control circuitry and robotics); etc. Critical parts 135 of the circuit 130 include voltage/power buses, ground lines, clock outputs, control (interrupt) inputs, memory register(s)/buffers, etc. A critical part 135 could be an AND gate. The invention is not limited to the particular type of critical part 135 of the external circuit 130, so long as the tag may enable or disable the external circuit 130 by a change in the critical part 135 caused by the RF tag through the connection 170. The external circuit enabler/disabler circuit 160 (described below) is connected to the critical part 135 through the connection 170 which can be one or more wires or a data bus as appropriate to make the connection. The circuit may be disabled in a preferred embodiment by connecting a critical part such as a clock output to a logic 1 (voltage) or 0 (ground) source through connection 170. When a steady 1 or 0 appears on such a clock output, (at the output of 160) the circuit will not work and is disabled. When the connection 170 has high impedance, the critical part does not see the connection 170, the critical part 135 works, and the circuit 130 is enabled.

In an alternative preferred embodiment, the external circuit is disabled by a logic circuit contained in the external circuit in response to data passed to and from the tag memory and the logic circuit contained in the external circuit.

Figure 2:
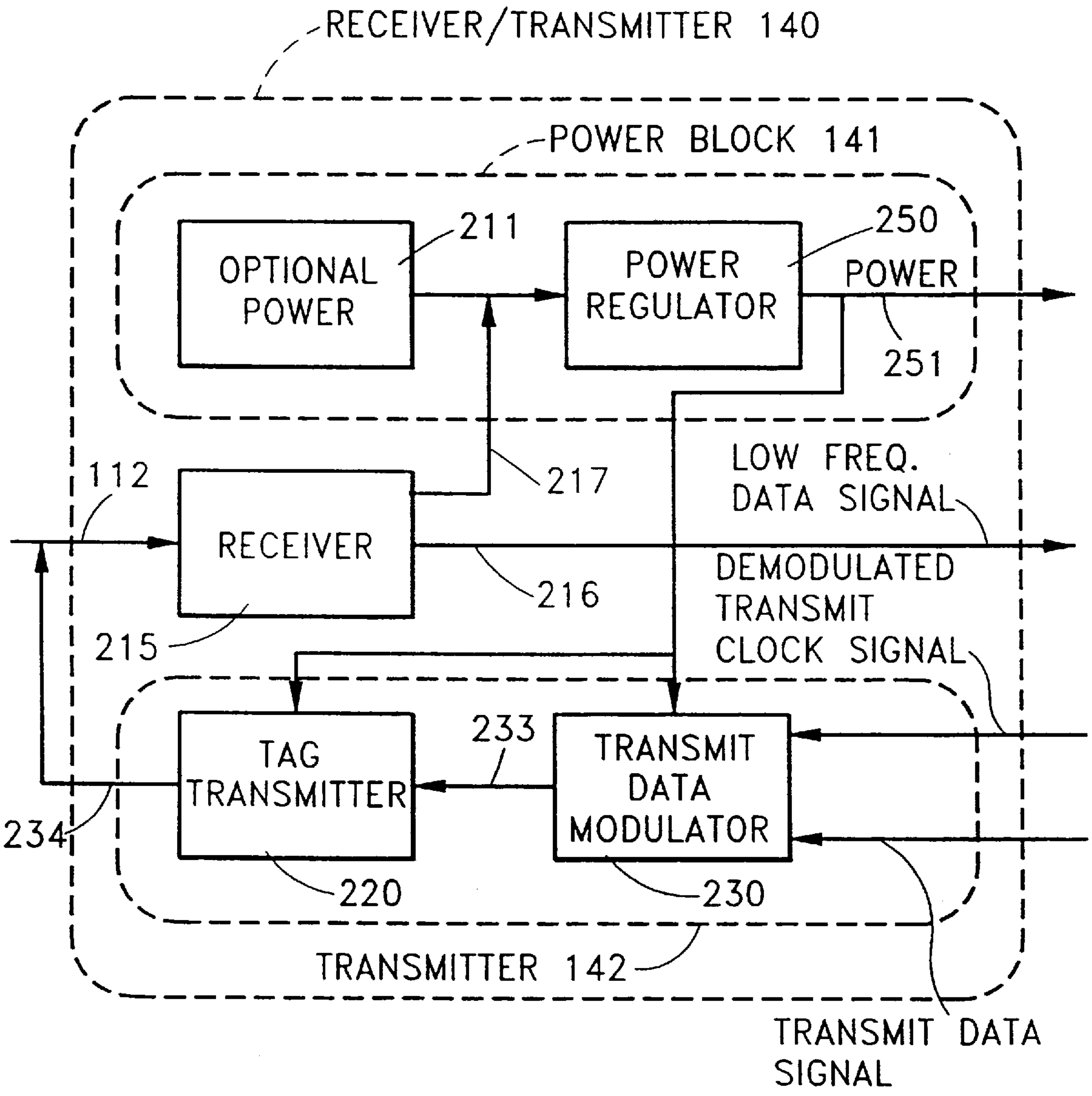
FIG. 2 is a block diagram of a preferred receiver/transmitter and power supply section of the RFID tag.

FIG. 2 is a more detailed block diagram of the receiver/transmitter block 140 of FIG. 1 comprising a preferred RF transmitter/receiver section 140 and a preferred power block 141 of a tag 120 with an external circuit enabling/disabling capability. In a passive version of the tag 120, the power used by the tag will be extracted from the radio frequency power 100 through the antenna 110 and RF receiver circuit 215. (Passive powering of RF tags is known.) The power passes from the receiver circuit 215 on line 217 to an optional power regulator 250 and hence on line 251 to power the rest of the tag electronics. In the case of an active tag, power may be taken from an optional battery or other power source 211, as known in the art, and passed through the optional power regulator 250 to power the rest of the tag electronics. The power supply portion of the tag is shown as block 141. The transmitter section 142 of the receiver/transmitter 140 shows the operation of the RF tag 120 transmitting information back to the base station. An unmodulated transmit clock signal 231 and a transmit data signal 232 are passed from the logic and memory section 150 to the transmit data modulator 230. The transmit data modulator 230 produces a transmit signal 233, which is then passed to the tag transmitter 220. The tag transmitter 220 controls the reflectivity of the tag antenna 110 to the RF power 100 on line 234, thereby communicating information from the tag logic and memory 150 back to the base station. Preferred embodiments of the tag with enable/disable capability may optionally include such a transmitter section 142. The low frequency data signal received from the antenna 110 by the receiver 215 is sent to the logic and memory block 150 over line 216.

Figure 3:
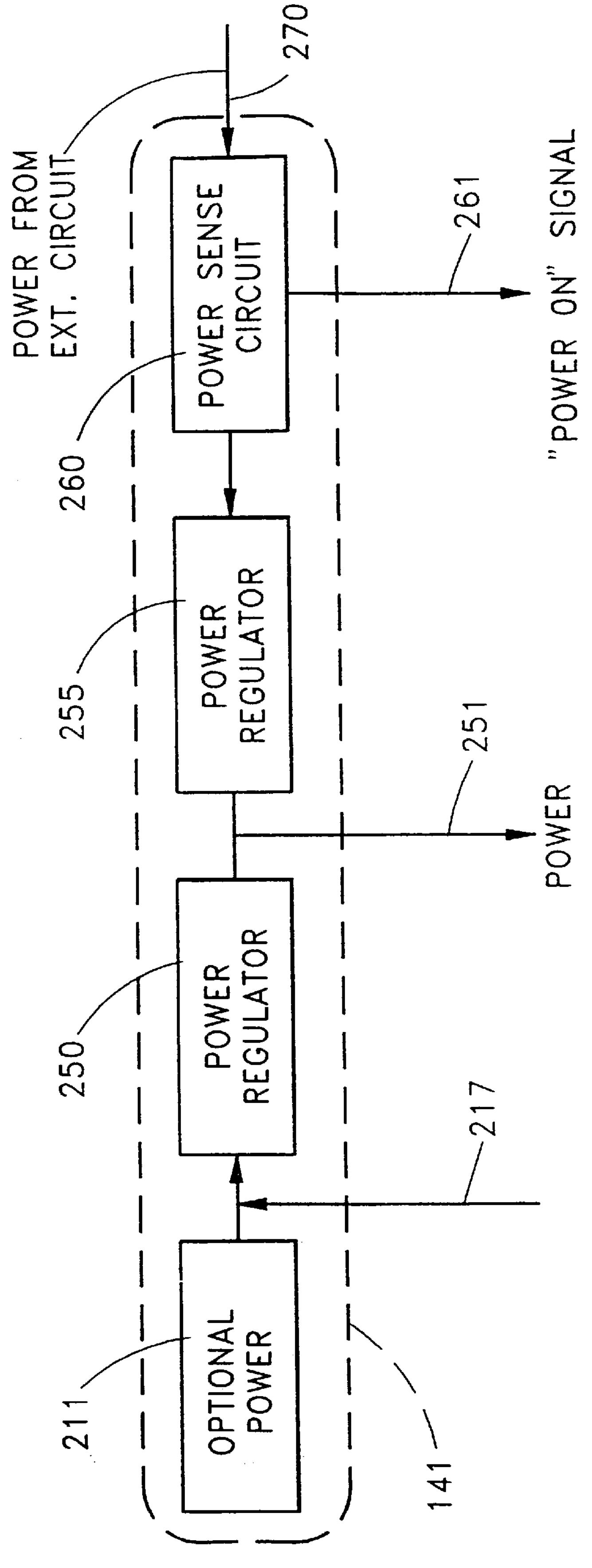
FIG. 3 is a block diagram of a preferred power supply section for the RFID tag.

FIG. 3 shows a block diagram of an alternative preferred power supply 141 that uses power from the external circuit which is being controlled to power the tag electronics. Power from the external circuit is brought in on line 270 to a power sense circuit 260, which sends out an external "power on" signal to various circuits on line 261. A power regulator 255 is also shown, so that the tag power signal on line 251 may be a steady and reliable voltage and current source. The optional tag power source 211 and the optional power regulator 250 are also shown. Preferred embodiments of the tag may optionally include the power sense circuit 260 and/or the power regulator 255 and/or the power source 211 and/or the power regulator 250.

Figure 4:
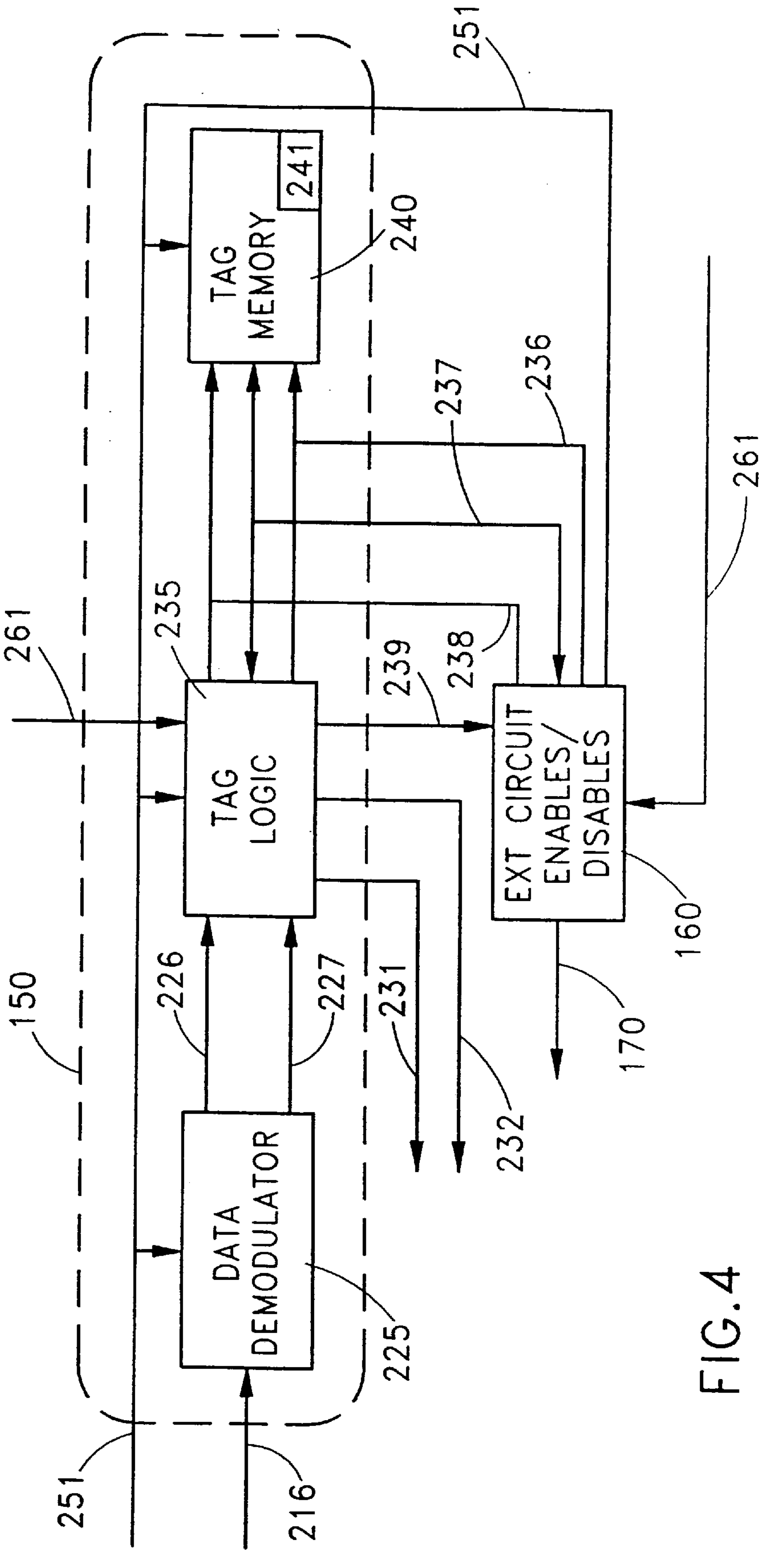
FIG. 4 is a block diagram of a preferred logic and memory section for the RFID tag.

FIG. 4 is a block diagram of a preferred logic and memory block 150 of the tag. The data demodulator 225 receives the low frequency received signal from the receiver 215 over line 216 and produces a clock signal transmitted on line 227 and demodulated data signal transmitted on line 226 to a state machine or processing tag logic 235. The state machine or processing tag logic 235 produces a tag memory control signal 236, passes (or receives) tag memory data 241 over tag memory data line 237 to (or from) the tag memory 240, and generates a tag memory address signal 238 which it passes to the tag memory 240. The processing logic or state machine 235 can also communicate back to the host base station via the transmit clock 231 and transmit data 232 signals. In addition to controlling the tag, the tag logic 235 produces an enable and/or disable signal 239 that is sent to the interface circuit 160. The optional external power on signal on line 261 can be used to disable the tag processing logic 235 and transfer control of the tag memory 240 to the external circuit interface 160 when the external circuit 130 is powered up.

Figure 5:
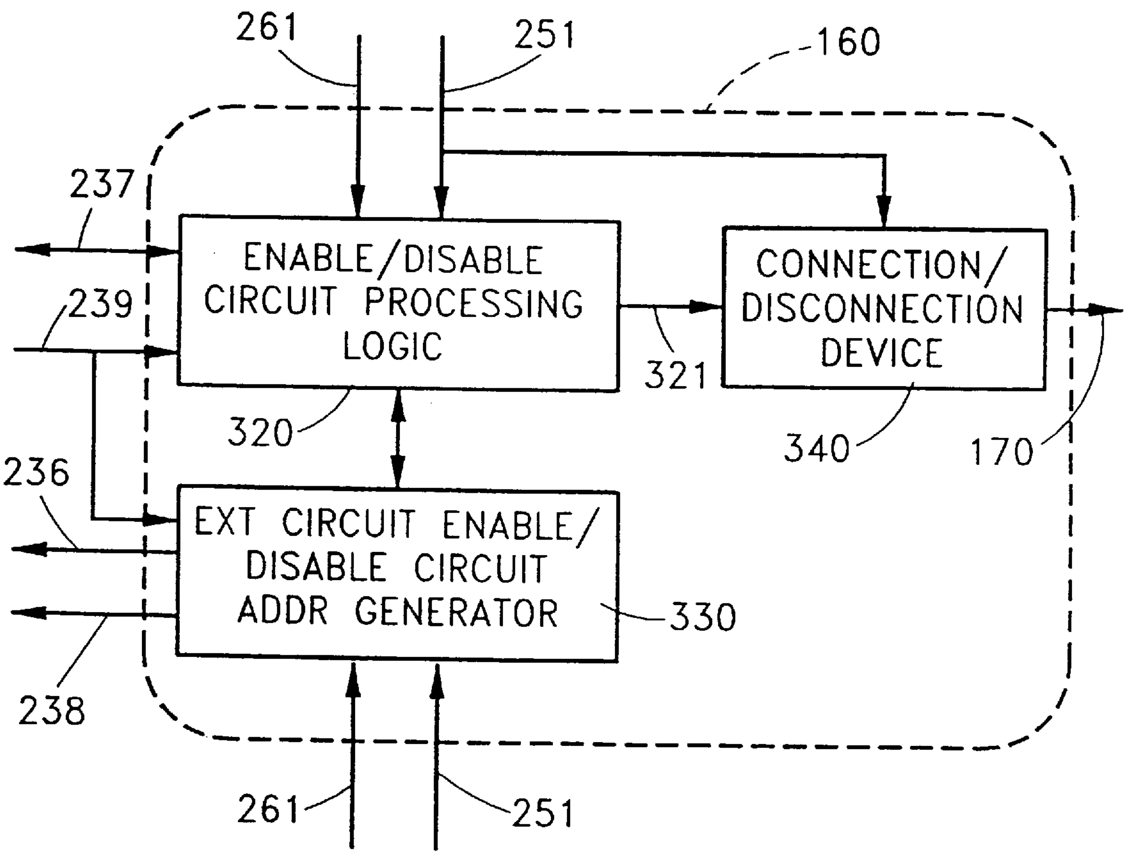
FIG. 5 is a block diagram of a preferred enabling/disabling section of the RF identification tag with single-line control of external circuit.

FIG. 5 is a block diagram showing one alternative embodiment of the external circuit enabling/disabling logic block 160 in the RF identification tag with a connection/disconnection device 340. This embodiment is important because it does not require redesign of any electronic equipment in order to use the enable/disable tag. The single line control 170 is merely attached to a critical part 135 in the external circuit. (Of course, a ground connection, not shown, is also necessary).

In one preferred embodiment, the external circuit 130 is controlled by means of a connection/disconnection device 340—e.g. a tri-state logic drivers or circuit switches. When power is supplied from the external circuit 270, the optional external circuit power sense circuit 260 produces an external "power on" control signal 261. This signal 261 can disable the tag processing logic 235, and ensures that there is no conflict between the tag logic 235 and the external circuit enabler/disabler 160. In a preferred embodiment, the address generator 330, in the external circuit enabler/disabler 160, generates a tag memory control signal 236 and a tag memory address signal 238 for the tag memory 240. In response to this tag memory control signal 236 and tag memory address signal 238, the tag memory 240 generates a data signal 237 which it passes to the external circuit enabler/disabler logic 320. If the tag memory data signal 237 matches a predefined pattern, or data value, the enabling/disabling logic 320 produces an external circuit enabling control signal 321. Alternatively, several data values 241 can be sent from the tag memory 240 over the tag memory data line 237 to the external circuit enabler/disabler 160 and compared. The control signal 321 places the connection/disconnection device 340—i.e. tri-state logic circuit, switches, diodes, transistors, etc.—in the enabled condition. For example, a tri-state logic circuit would be placed in the high-impedance condition. Alternatively, switches, diodes, or transistors would be set to connect or disconnect the appropriate signal lines to enable the external circuit 130. Under this condition, the external circuit is unaffected because the line 170 looks like an open circuit or connects appropriate signal lines together in the external circuit 130. If however, the tag memory data signal 237 does not match the predefined pattern, the external circuit is disabled. For examples of tri-state logic circuits see "LS/S//TTL Logic Databook" by National Semiconductor which is herein incorporated by reference in its entirety.

Figure 6:
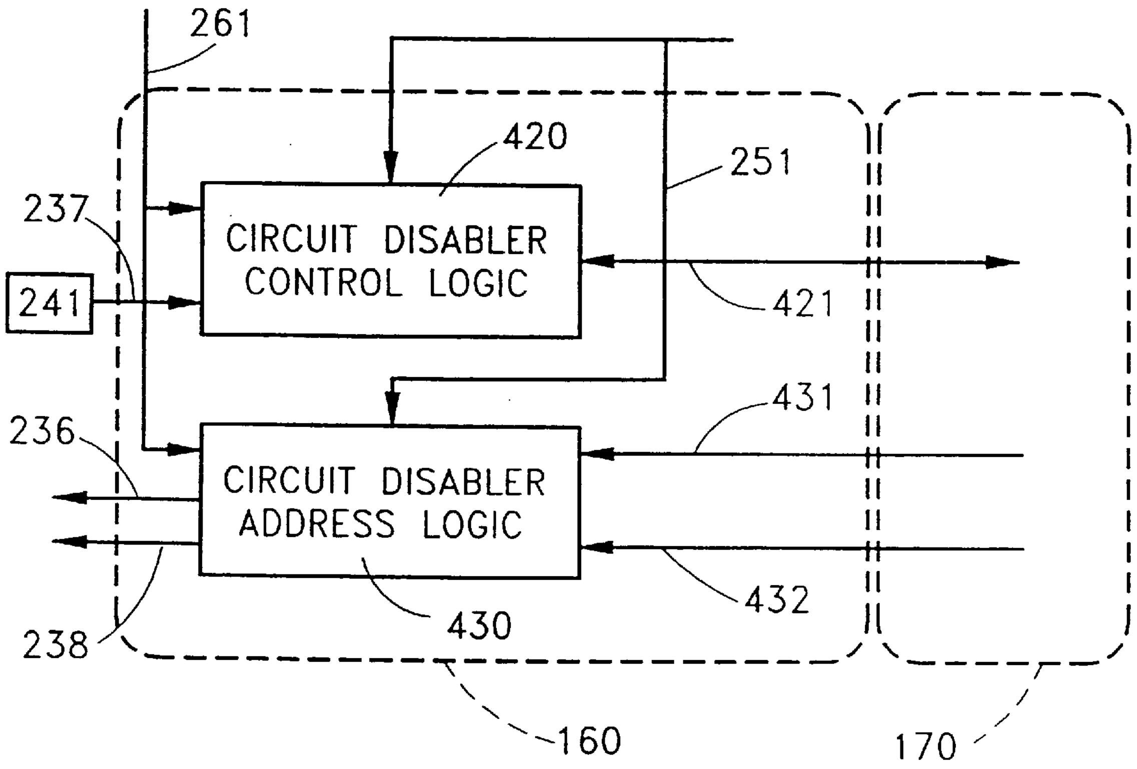
FIG. 6 is a block diagram of a preferred electronic circuit enabling/disabling RF identification tag with direct tag access by the external electronic circuit.

FIG. 6 shows a detailed diagram of an alternative preferred external circuit enabling/disabling logic block 160 in the tag 120 that allows logic and memory circuits in the external electronic circuit 130 direct access to the tag memory 240. In this embodiment, the external circuit 130 continually checks the tag memory (e.g. by using an executed program) to verify that the tag 120 is still connected to the external circuit 130 critical part 135, and has not been cut out of the external circuit 130 to defeat the system, e.g., antitheft controls embodied in the tag 120. In this embodiment, the external electronic circuit 130 critical part 135 presents a circuit disabler address signal on line 431 and a circuit disabler clock signal on line 432. Other means of presenting 431 and 432 are possible, for example encoding them together and presenting them on one line. These signals are presented to the circuit disabler address logic 430, which decodes this information and generates a tag memory control signal 236 and a tag memory address signal 238 to the tag memory 240. The tag memory then places the tag memory data 241 on line 237, and this data is passed to the circuit disabler control logic 420, and then to the external circuit on line 421. This data may be presented continuously; it may be presented at a single time when the circuit is first powered up; or the signal may be presented intermittently. The external circuit enabling/disabling circuit 160 can optionally be powered by the external circuit supplied power over line 251. In an alternative embodiment, when external power is present, the external power sense signal 261 can enable the external circuit disabler/enabler circuit address logic 430 and disable the control logic 235 of the RFID tag.

Figure 7:
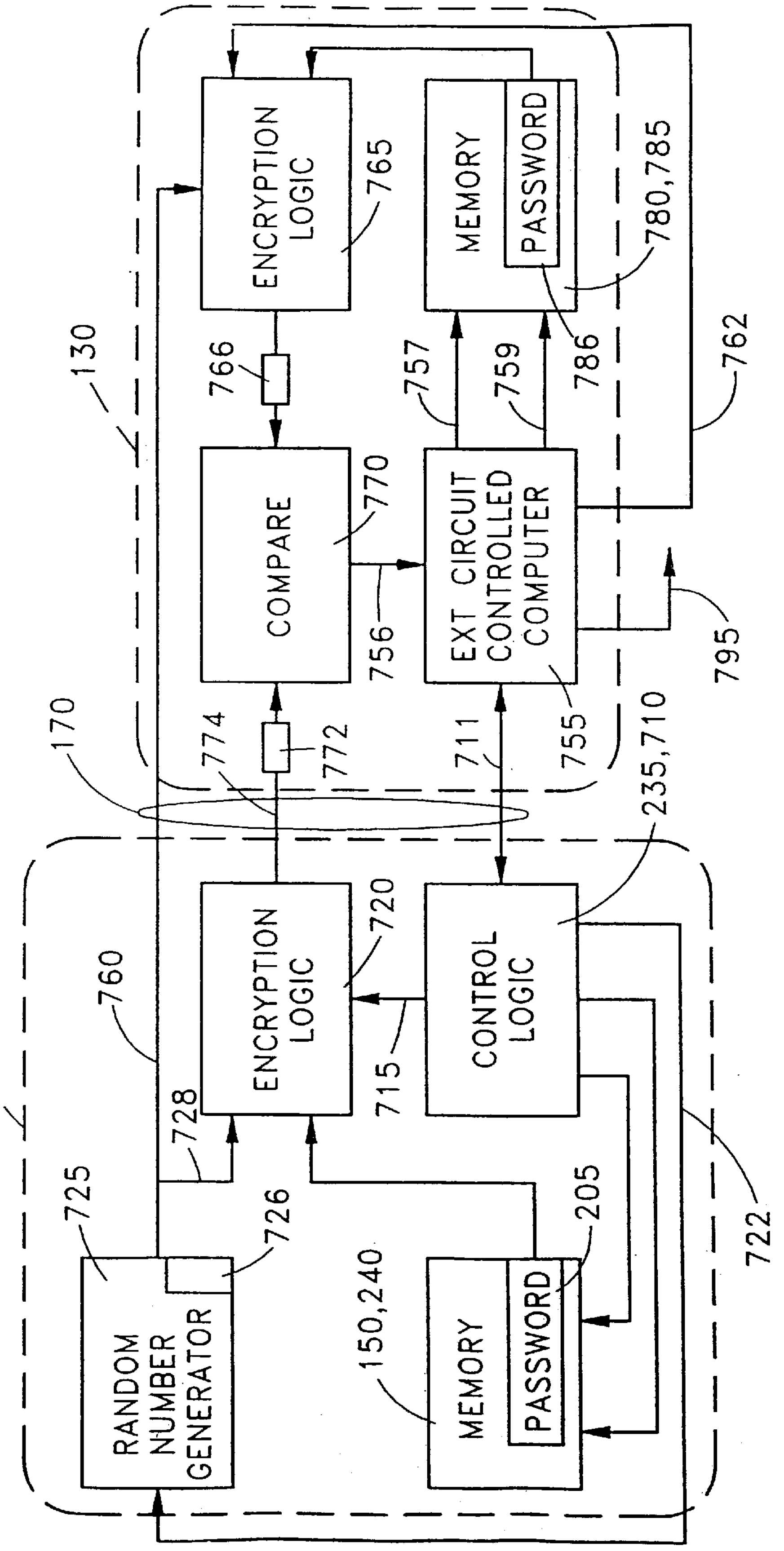
FIG. 7 is a block diagram of an alternative preferred embodiment of the tag where the tag has encryption capabilities.

FIG. 7 is a block diagram of an alternative preferred embodiment of the tag 120 where the tag 120 is connected 170 to the external circuit 130 and has encryption capabilities that make defeating the system more difficult. In this embodiment, the tag 120 has a memory (150, 240) that includes a password (also called a key) 705 that can be unique to the particular tag 120. In other applications, the tags 120 made in a given batch could have the same password 705. In addition, the tag 120 comprises a control logic (710 , 235) that is capable of controlling and addressing the memory 150. The control logic (710, 235) also has a bidirectional tag control signal 711 that connects to an external circuit controller 755 and a tag encryption control connection 715 to a tag encryption logic 720. In one embodiment, the tag 120 also has a tag number generator 725 that is capable of providing the tag encryption logic 720 one or more numbers 726 (e.g., integer values or random numbers 726) on a tag random connection 728. The tag number generator 725 also provides the external circuit 130 the number 726 over an external number line 760 to a external encryption logic circuit 765. The tag encryption logic 720 is also connected to an external circuit comparator 770 that receives an encrypted number 772 over an encrypted number connection 774. The external circuit 130 also has an external memory 780 with a location 785 containing an external password 786. The external circuit controller 755 has control 757 and address 759 connections to the external memory 780. The number line 760, the tag encrypted password line 774, and the tag control line 711 are the connection 170 in this embodiment.

Figure 8:
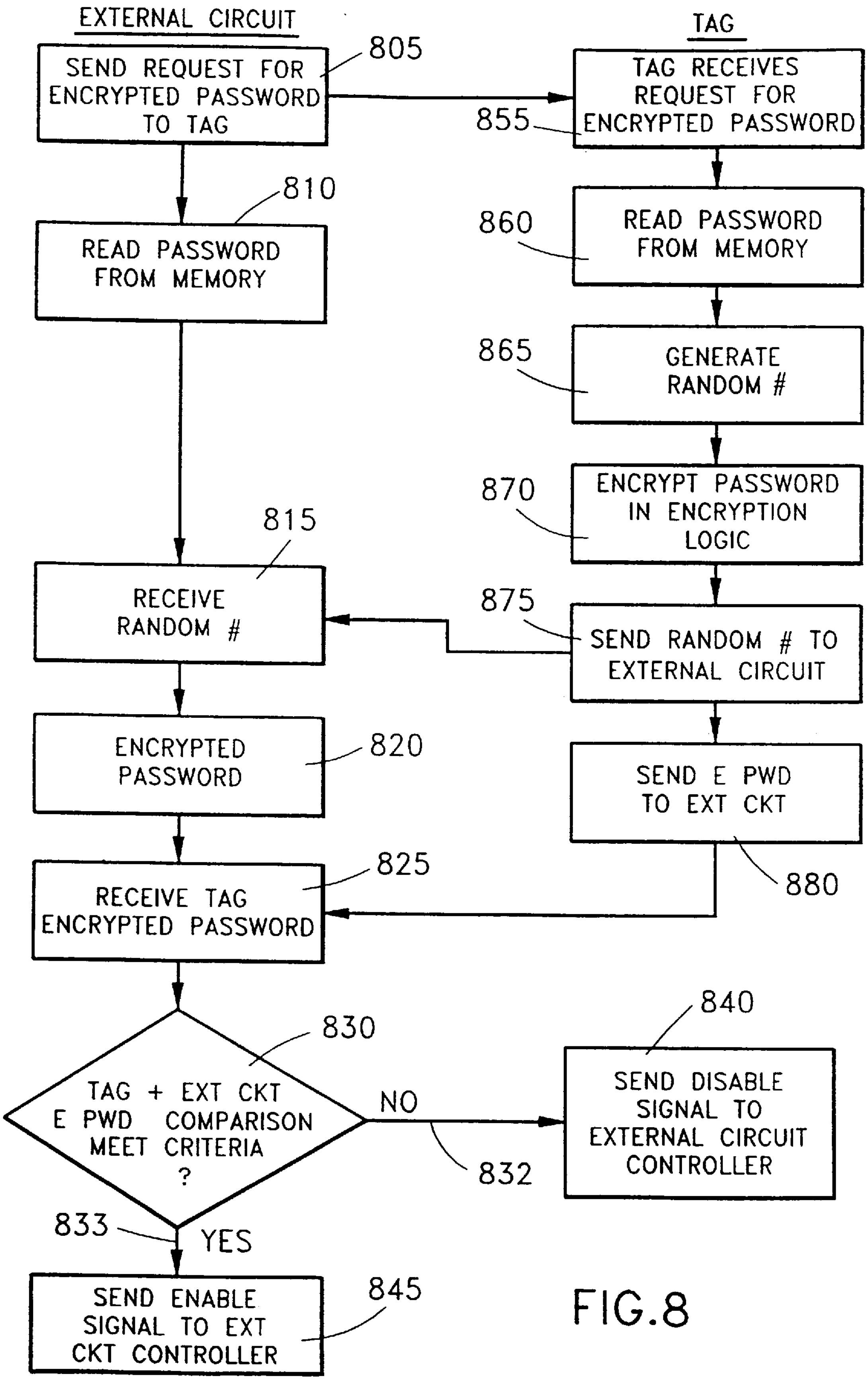
FIG. 8 is a flowchart showing the steps of a password exchange process used by the preferred embodiment described in FIG. 7.

Refer to FIG. 8 which is a flow chart describing the steps performed by a password (key) exchange process 800 (by both the external circuit 130 and the tag 120) used during the operation of the system 700. In step 805, the external circuit 130 requests the tag encrypted number 772 from the tag 120 by sending the request from the external control logic 755 to the tag control logic 235 over the tag control line 711. (Note that the roles of the tag and external circuit can be reversed in the description). After the tag receives the request 855, the tag control logic 235 reads 860 the tag password 705 from the tag memory 150 and sends the tag password 705 to the tag encryption logic 720. The tag control logic 235 sends a signal over the number control line 722 to cause the tag number generator 725 to generate 865 a number 726 and pass the number 726 to the tag encryption logic 720. The tag encryption logic 720 encrypts 870 the number 726 with tag password 705 using any encryption technique that is well known in the data encryption arts. The tag number generator 725 also sends 875 the external circuit 130 (specifically to the external encryption logic 765) the number 726 over the number line 760 . The tag encryption logic 720 also sends 880 the encrypted number 772 over the encrypted number connection 774 to the external circuit 130 (specifically the external comparator 770). After sending the request 805 for the tag encrypted number 772, the external circuit controller 755 reads 810 the external password 786 from the memory 780 location 785. Upon receiving 815 the tag number 726 across the tag number line 760, the external circuit control logic 755 sends a signal over the external circuit encryption logic control line 762. This signal causes the external circuit encryption logic 765 to encrypt 820 the received tag number 726 to create an external encrypted number 766. Upon receiving 825 the tag encrypted number 772 across the tag encrypted number line 774, the external circuit controller 755 causes the external comparator 770 to compare 830 the tag encrypted number 772 with the external encrypted number 766. If the two encrypted numbers (772,766) meets criteria, preferably that they are the same, 833, an enable signal is sent 845 to the external circuit controller 755 across the comparator line 756. If the two encrypted numbers (772, 766) fail to meet the criteria, e.g. are not the same 832, a disable signal is sent 840 to the external circuit controller 755 across the comparator line 756. Alternatively the enable 845 (or disable 840) is used to change an initial disabled (enabled) "state" of the external circuit. The external circuit controller 755 enables and disables the external circuit 130 by using any of the means described above 795. In addition, the controller can be an external logic apparatus that provides an enabling and disabling signal such as a halt 795 or interrupt 795 to the external circuit 130. In an alternative embodiment the external circuit controller 755 can be a function—e.g. microcode, software, firmware—on itself 755 or the external circuit 130. Note that the external circuit 130 can be enabled and/or disabled by having the base station (not shown) change the tag password 705 so that the tag encrypted number 772 and the external encrypted number 766 either match or don't match.

The system 700 and method 800 are useful because the system provides an encrypted password (security) for the tag to control the enabling and disabling of the external circuit 130. While the tag encryption logic 720 and the external encryption logic 765 can be well known, and even provided in an open specification, one can not break the encryption of the system by knowing the encryption processes (720, 765) even by monitoring the encrypted password 772 and the number 726. This is because a different encryption (772, 766) occurs for each number 726 that the number generator 725 generates. Note that the tag encryption logic 720 and the external encryption logic 765 in this system 700 are compatible, e.g., identical. Note also that the roles of the tag circuit and external circuit may be reversed. For example, the external circuit can generate the number and pass it to the tag.

Figure 9:
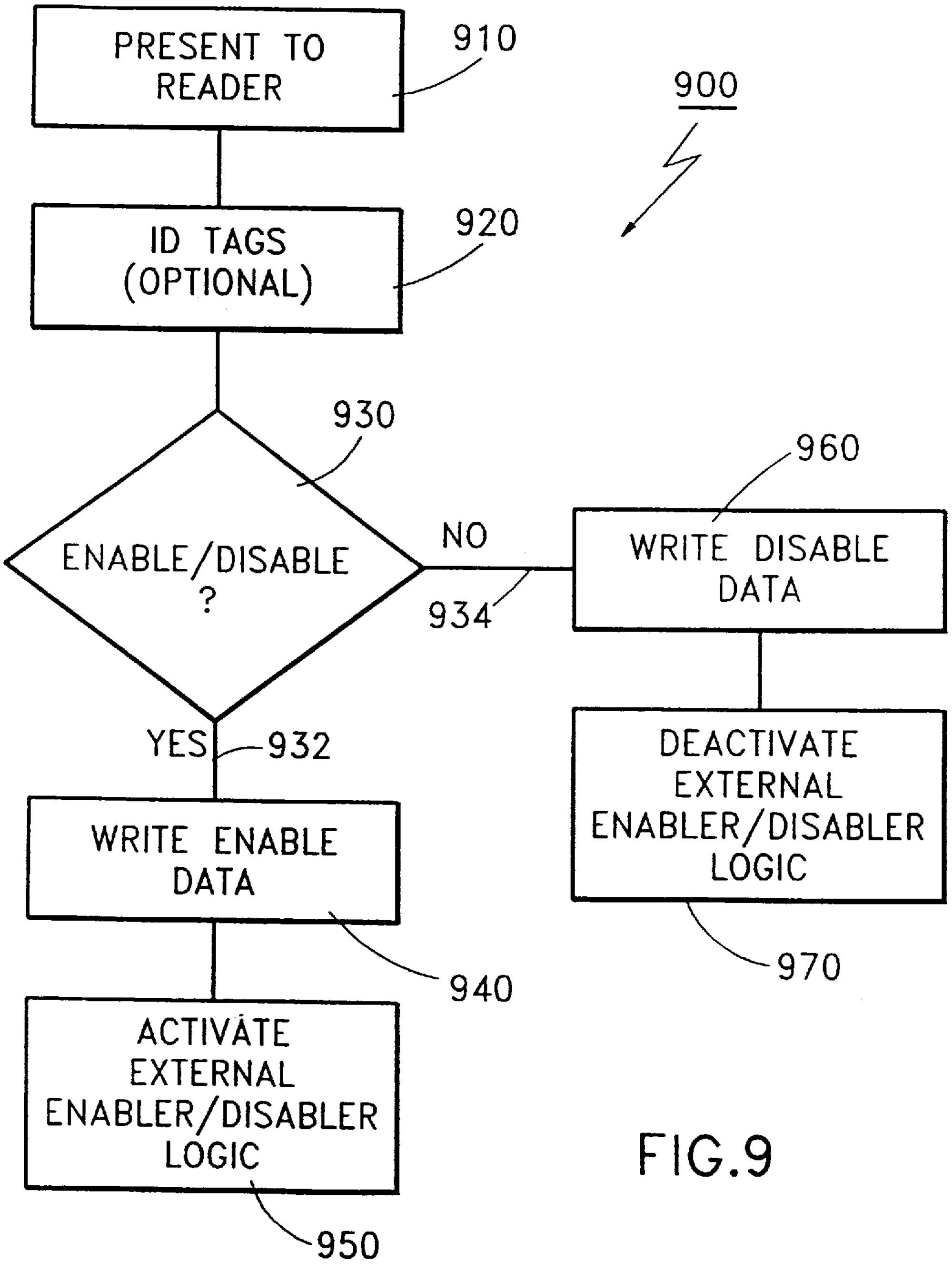
FIG. 9 is a flowchart diagram of the process for configuring the RF identification tag to enable or disable the external electronic circuit.

FIG. 9 is a flow chart for how a base station (reader) programs 900 the RF identification tag with external circuit enabler/disabler capability to configure the external circuit enable/disable logic 160. In order to set the RF identification tag to enable or disable an external electronic circuit, the RF identification tag is first presented to a base station or reader in step 910. The reader optionally identifies the tag at step 920. The external reader then determines at step 930 whether it should enable or disable the external electronic circuitry to which the tag is connected. If the RF identification tag should enable 932 the external electronic circuit to which it is connected, then the RF identification reader writes 940 the enable data onto the RF identification tag memory 240. The RF identification tag then activates 950 the external circuit enabler/disabler logic 160. If the base station/reader determines at step 930 that the RF identification tag should disable 934 the external electronic circuit to which it is connected, then the RF identification reader writes the disable data onto the RF identification tag memory 240 in step 960. The RF identification tag then deactivates 970 the external circuit enable/disable logic 160 to disable the external electronic circuit. In one preferred use, e.g., sale of the external electronic circuit, the disable mode 970 would be the default mode for the RF identification tag, so that if the tag did not go through this enabling process (930, 940 950) (i.e. is stolen), the external electronic circuit 130 to which the RF identification tag is attached would remain disabled. In another preferred embodiment, all tags passing through the zone of a reader would be either enabled (steps 910, 940, 950) or disabled (steps 910, 960, 970) in an application where the default mode of a tag would always be set—i.e. either branch 932 or 934 would always be taken.

Figure 10:
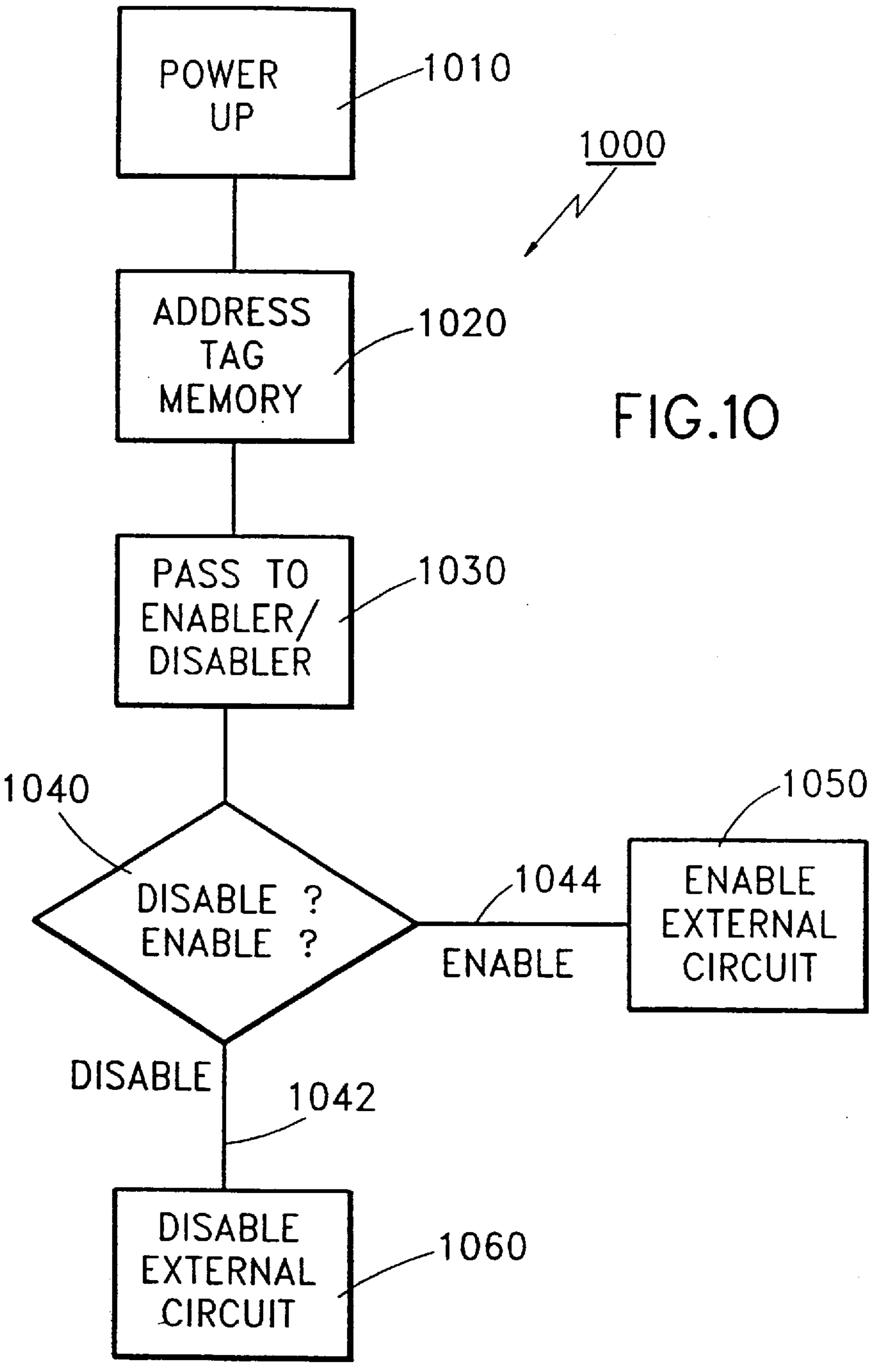
FIG. 10 is a flowchart of a process by which the RF identification tag enables or disables an external electronic circuit with a connection/disconnection device—i.e. tri-state drivers, to control an external circuit signal line, or switches, to connect or disconnect external circuit signal lines.

FIG. 10 is a flowchart of a process 1000 by which the RF identification tag enables or disables an external electronic circuit by using connection/disconnection device—i.e. tri-state logic circuit, switches, diodes, transistors, etc.—to control an external circuit signal line, or to connect or disconnect the external circuit signal lines 170. (For example see FIG. 5).

Initially, in step 1010, the external circuit 130 powers up and powers up the tag electronics 120. Alternatively, the tag can be powered by any of the ways discussed above. After powering up 1010, the RF identification tag circuit disabler/enabler 160 addresses 1020 the tag memory 240. In step 1030, data 241 in the tag memory 240 on the RF identification tag 120 is sent to the external circuit enabler/disabler 160 over tag memory data line 237. In step 1040, the RF identification tag external circuit enabler/disabler 160 decides on the basis of the tag memory data 241 whether the external circuit 130 should be enabled or disabled. This can be done by comparing the data value 241 received from the tag memory 240 to a (fixed or changeable) value in the enabler/disabler 160. Alternatively, several data values 241 are sent from the tag memory 240 over the tag memory data line 237 to the external circuit enabler/disabler 160 and compared 1040. If the external circuit 130 should be disabled 1042 then the external electronic circuit 130 is disabled in step 1060 by setting the connection/disconnection device—i.e. tri-state logic circuit, switches, diodes, transistors, etc.—to a disabled condition. For example, the enabler/disabler 160 sets 1060 a tristate driver to a low impedance state (see above) or, alternatively, the circuit enabler/disabler 160 sets a switch to open the external circuit traces, or the enabler/disabler 160 sets a switch to short external traces. Thereby, the external electronic circuit is disabled 1060. On the other hand, if the tag enabling/disabling circuitry 160 determines in step 1040 that the external circuit 130 will be enabled 1044 , then the external circuit enabler/disabler 160 sets 1050 the enabling conditions. For example, the tri-state drivers in the external circuit enabler/disabler 160 are set 1050 to the high impedance state or, alternatively, the external circuit enabler/disabler 160 switches 1050 the external circuit traces to connect them, or enabler/disabler 160 opens 1050 the external circuit traces to enable 1050 the external circuit .

Figure 11:
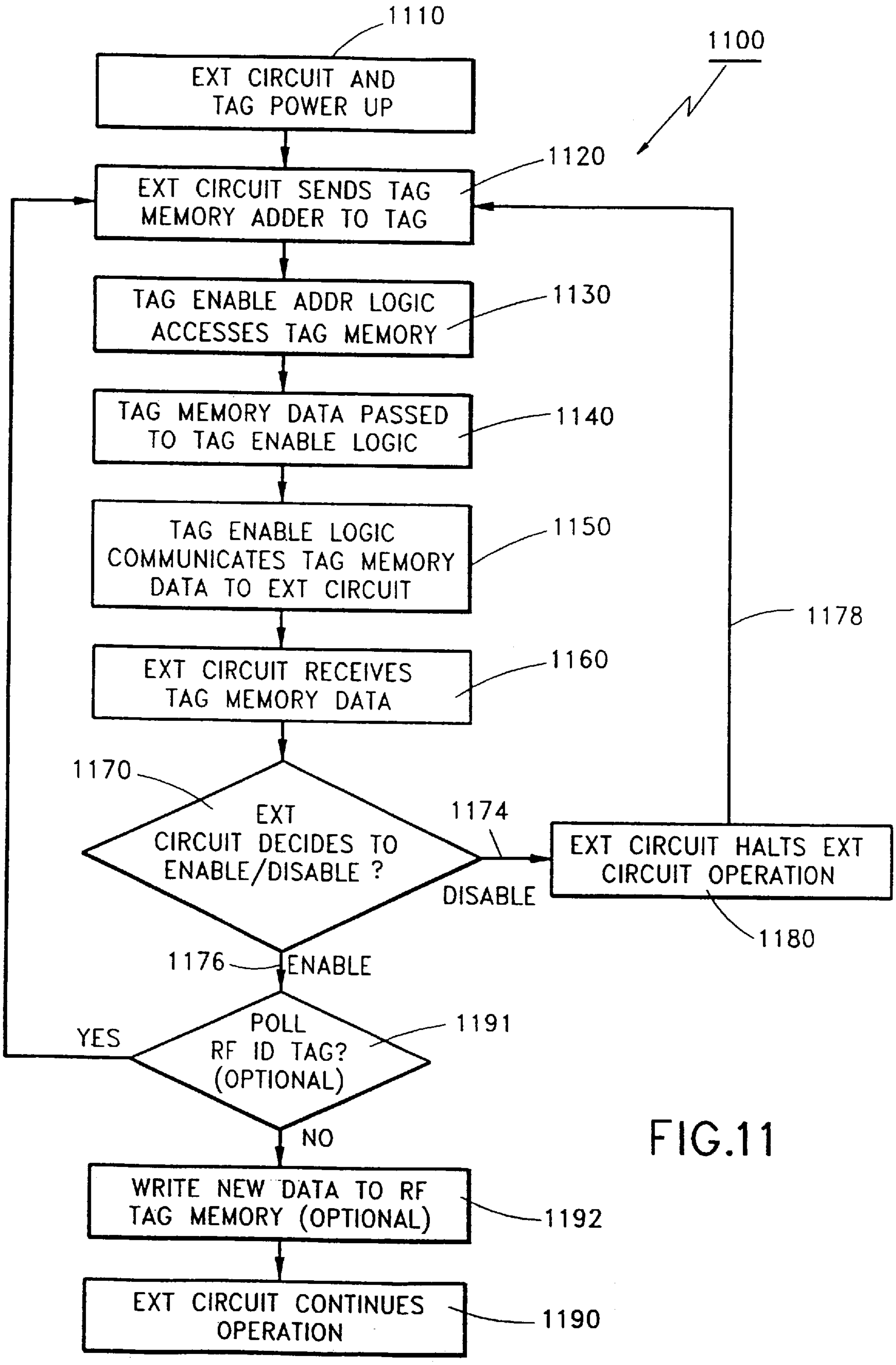
FIG. 11 is a flow chart of the process by which the RF identification tag may enable or disable an external electronic circuit by allowing the external circuit to read and optionally write the RF identification tag memory.

FIG. 11 is a flow chart of a direct memory access process 1100 performed by the RF identification tag 120 with external circuit enabling/disabling capability. In this situation, the external circuit and the tag are powered up in step 1110. In step 1120, the external circuit 130 sends the external circuit enabler/disabler circuit 160 an address that it 130 wishes to access in the tag memory 240. In step 1130, the circuit disabler address logic 430 decodes the address information sent to it from the external circuit 130, and accesses the tag memory 240 using the memory control signal 236 and the address signal 238. In step 1140, the tag memory data 241 accessed in step 1130 is passed to the enable/disable circuit processing logic 420 across the memory data line 237. In step 1150 the circuit disabler control logic 420 communicates the tag memory data 241 to the external circuit 130 over the external circuit data access line 421, or optionally the circuit disabler control logic 420 may compress, encode, and/or put into the appropriate communications protocol, the tag memory data 241 or simply flag its presence. In step 1160, the external circuit receives the tag memory data 241. The external circuit then decides, step 1170, on the basis of the tag data 241 whether to enable 1172 or disable 1174 the external circuit operation. For example, this decision may be made on the basis of data 137 (see FIG. 1) that the external circuit has in its memory, or a comparison of several data 241 stored in separate locations in the tag memory 240. If the external circuit should be disabled 1174, the external circuit in step 1180 halts the external circuit 130 operation, or optionally disables it 130 intermittently. The system may optionally return 1178 to step 1120 in the event there is a reading error in any of the preceding steps or until the tag data 241 is changed via the base station to an enabling value . If the external circuit 130 determines that it 130 should be enabled 1176 in step

1170, the external circuit would continue normal circuit operation in step 1190. The external circuit may optionally periodically poll 1191 the RF identification tag to make sure that it has not been removed or tampered with by returning 1195 to step 1120.

In addition, the external circuit 130 could optionally write new data 1192 into the tag memory 240 across a bidirectional tag memory data line 421 by sending the appropriate tag memory addressing and clock signals across lines 431 and 432 respectively. Data written to the tag memory 241 by the external circuit 130 could optionally be hidden from access by the base station. These data 241 could include security or additional information like inventory. The security data 241 written to the tag memory 240 by the external circuit 130 would prevent tampering or removal of the tag, because both the data 241 written by the base station and the data written by the external circuit would be needed to enable the external circuit 130. In this embodiment the tag would be continually repolled (1191, 1195)

Figure 12:
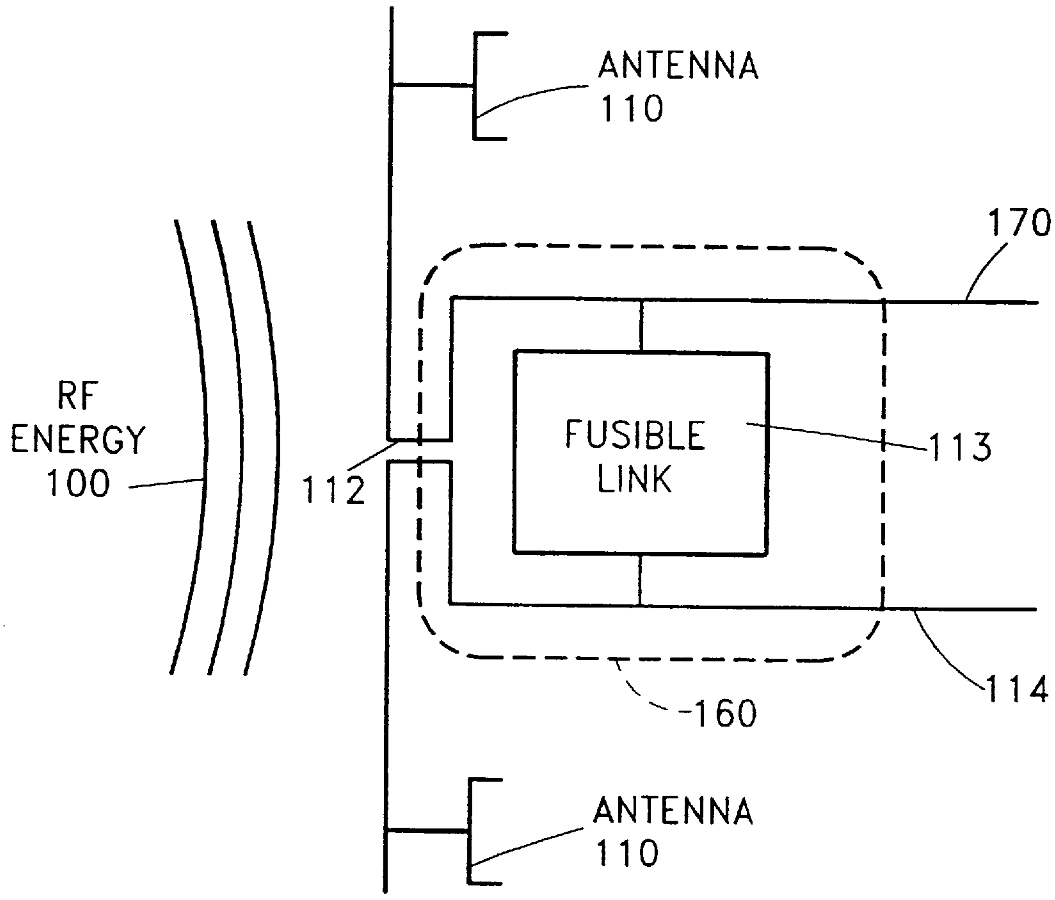
FIG. 12 is a block diagram of an RF tag having a fusible link which when fused by the RF field enables the external circuit.

FIG. 12 is a block diagram of a preferred simple enabling circuit using a single bit memory tag and using the RF energy 100 incident on the tag antenna 110 (shown in FIG. 12 as a simple dipole antenna, although spiral antennas and coil antennas and patch antennas as known in the art would work as well), to cause a change of state in the external circuit enabling/disabling block 160 in order to enable the external circuit via the line 170. In this case, low switch energy switch such as a fusible link or a combination of low write energy ferromagnetic memory element (FRAM) with a diode can be used as a memory element. When the RF energy is sufficient, the fusible link 113 fuses and opens the connection between the leads 114 ( connected to the common ground) and 112 of the antenna 110. The external line 170 is connected to the antenna lead 112. The external circuit is connected to line 170 at a critical point, which is initially grounded and renders the external circuit inoperable until the fusible link 113 is fused by the RF field. Thereafter, the line 170 has a high impedance to ground, and the external circuit is enabled. Fusible links connected to RF antennas are well known in the art.

Given this disclosure alternative equivalent embodiments will become apparent to those skilled in the art. These embodiments are also within the contemplation of the inventors.

We claim:

1. A radio frequency (RF) tag for connection to an external electrical circuit, the RF tag having an antenna for receiving an RF signal to be sent to the RF tag upon authorized transfer of possession of the external circuit, a radio frequency section for demodulating the RF signal to create a demodulated RF signal, and a memory, the tag further comprising:
   - a logic that puts data in the memory in response to the demodulated RF signal; and
   - a circuit enabler/disabler that accesses the data in the memory, and enables the external electrical circuit to fully function only when the RF tag has received the RF signal to be sent to the RF tag upon authorized transfer of possession of the external circuit by perturbing a critical part of the external electrical circuit through a connection when the data in the memory satisfies certain conditions.

2. A radio frequency tag capable of being connected to an external electrical circuit, as in claim 1, where the circuit enabler/disabler is capable of enabling and disabling the external circuit by changing a state of a component to perturb the critical part of the external electronic circuit.

3. A radio frequency tag, as in claim 2, where the component includes any one of the following:
   - a tri-state logic driver, a switch, a transistor, a diode, fusible link, and triac.

4. A radio frequency tag, as in claim 1, where the critical part of the external electrical circuit includes any one of the following: a ground line, a signal line, a voltage supply line, a clock output line, a connection, an interconnect line, a connection in a semiconductor circuit chip, and a current supply line.

5. A radio frequency tag, as in claim 4, where the component perturbs the critical part by providing a signal to the critical part.

6. A radio frequency tag, as in claim 5, where the signal provided to the critical part is random.

7. A radio frequency tag, as in claim 5, where the signal provided to the critical part is provided at random intervals.

8. A radio frequency tag, as in claim 1, where the enabler/disabler is a logic circuit.

9. A radio frequency tag system, comprising:
   - an external electrical circuit with a memory bus;
   - a direct memory access process executing on the external electrical circuit and being capable of enabling and disabling full operation of the external electrical circuit;
   - an RF tag having an antenna for receiving an RF signal sent to the RF tag upon authorized transfer of possession of the external electrical circuit and further having an RF tag memory containing one or more values that are changed by the RF signal; and
   - a memory interface connecting the RF tag memory to the memory bus, the external circuit being capable of reading the one or more values across the memory bus, and the direct memory access process enabling the external electrical circuit to function fully only when the RF tag memory contains the one or more values that have been changed by the RF signal.

10. A radio frequency (RF) tagging system comprising:
    - an external circuit having an external encryptor and an external memory, the external memory storing an external password;
    - a number generator for generating one or more numbers;
    - a radio frequency tag, having a tag control logic, a tag memory, and a tag encryption logic, the tag memory containing a tag password, the tag encryption logic encrypting the number with the tag password to created a tag encrypted number;
    - an external circuit controller on the external circuit, the external circuit controller receiving a tag control signal from the tag control logic and the external circuit controller causing the external encryptor to encrypt the number with the external password to create an external encrypted number;
    - a comparator that compares the tag encrypted number to the external encrypted number, the comparator causing the external circuit controller to enable the external circuit if the tag encrypted number and the external encrypted number meet criteria and the comparator causing the external circuit controller to disable the external circuit if the tag encrypted number and the external encrypted number do not meet the criteria.

11. A radio frequency system, as in claim 10, where the criteria is that the tag encrypted number and the external encrypted number are equal.

12. A radio frequency (RF) tagging system, comprising:
    - an external electrical circuit with a critical part, the critical part being capable of enabling and disabling full operation of the external electrical circuit;

an RF tag having an antenna for receiving an RF signal sent to the RF tag upon authorized transfer of possession of the external electrical circuit, a radio frequency section for demodulating the RF signal to create a demodulated RF signal, a memory, and an enabler/disabler, the enabler/disabler producing a perturbation when a value is in the memory; and a connection connecting the enabler/disabler to the critical part, the perturbation perturbing the critical part when the value is in the memory so that the external circuit is disabled from functioning fully. the value in the memory being changed to another value when the RF signal is received so as to enable the external circuit to function fully.

13. A system, as in claim 12, where the RF signal is sent by a base station.

14. A system, as in claim 13, where the external circuit is enabled when the enabler/disabler ceases to produce the perturbation.

15. A tag, comprising:

an antenna for receiving an RF signal sent to the tag upon authorized transfer of possession of an external circuit;

a fusible link electrically connected to the antenna, the fusible link fusing when the antenna receives the RF signal; and a connection for connecting the fusible link to the external circuit, the fusible link changing an electrical property when fused, the changed electrical property enabling the external circuit.

16. A method for enabling an external electronic circuit to function fully only upon authorized transfer of possession, comprising the steps of:

sending a predetermined radio frequency signal to a radio frequency tag upon authorized transfer of possession of the external electronic circuit, the radio frequency tag receiving the signal and having a fusible link that fuses upon receipt of the predetermined radio frequency signal and thereby changes an electrical property when the signal is received; and enabling the external electronic circuit to function fully only when the fusible link is fused through a connection between the external electronic circuit and the fusible link due to the change in the electrical property.

17. A method for enabling an external electronic circuit to function fully only upon authorized transfer of possession, comprising the steps of:

sending a predetermined radio frequency signal to a radio frequency tag only upon authorized transfer of possession of the external electronic circuit;

demodulating the radio frequency signal to obtain one or more values;

writing the one or more values to a tag memory;

accessing the one or more values by an enabling/disabling circuit connected to a critical part of the external electronic circuit, the enabling/disabling circuit being capable of enabling and disabling the external electronic circuit by perturbing a critical part; and enabling the external electronic circuit to function fully only when the one or more values have been written to the tag memory.

18. A method for enabling an external electronic circuit to function fully only upon authorized transfer of possession, comprising the steps of:

a. sending a predetermined radio frequency signal to a radio frequency tag only upon authorized transfer of possession of the external electronic circuit;

b. demodulating the radio frequency signal to obtain one or more values;

c. writing the one or more values to a tag memory;

d. accessing the one or more values by the external electronic circuit across a memory bus connected to the tag memory; and enabling the external electronic circuit to function fully only when the one or more values have been written to the tag memory.

19. A method for enabling an external electronic circuit to function fully only upon authorized transfer of possession of the external circuit, comprising the steps of:

providing a tag password to the tag;

providing an external password to the external circuit, either the tag password or the external password being provided upon authorized transfer of possession of the external circuit;

performing a password comparison between the external password and the tag password; and enabling and disabling the external circuit to function fully in accordance with the password comparison.

20. A method as in claim 19 where the tag password and the external password are encrypted.

* * * * *